US008678511B2

(12) United States Patent
Grover

(10) Patent No.: US 8,678,511 B2
(45) Date of Patent: Mar. 25, 2014

(54) ADJUSTABLE AUTOMOBILE AIR CUSHION APPARATUS

(76) Inventor: Vinod M. Grover, Carrollton, GA (US)

( * ) Notice: Subject to any disclaimer, the term of this patent is extended or adjusted under 35 U.S.C. 154(b) by 280 days.

(21) Appl. No.: 13/018,590

(22) Filed: Feb. 1, 2011

(65) Prior Publication Data
US 2012/0193957 A1    Aug. 2, 2012

(51) Int. Cl.
*B60R 21/18* (2006.01)
(52) U.S. Cl.
USPC .......................................... 297/482; 280/733
(58) Field of Classification Search
USPC ................. 297/452.41, 482, 216.1; 280/733
See application file for complete search history.

(56) References Cited

U.S. PATENT DOCUMENTS

| | | | | |
|---|---|---|---|---|
| 568,474 A | * | 9/1896 | Clark | 297/199 |
| 626,644 A | * | 6/1899 | Widdershoven | 297/199 |
| 2,199,047 A | * | 4/1940 | Fisher | 5/655.3 |
| 3,883,053 A | * | 5/1975 | Pritchard et al. | 224/264 |
| 5,330,255 A | * | 7/1994 | Stawicki | 297/391 |
| 5,584,536 A | * | 12/1996 | White | 297/482 |
| 5,795,030 A | * | 8/1998 | Becker | 297/488 |
| 6,189,921 B1 | * | 2/2001 | Takeuchi | 280/733 |
| 6,237,945 B1 | * | 5/2001 | Aboud et al. | 280/733 |
| 7,121,628 B2 | * | 10/2006 | Lo | 297/482 |
| 7,318,606 B1 | * | 1/2008 | Berke | 280/801.1 |
| 7,448,522 B2 | * | 11/2008 | Collier et al. | 224/264 |
| 2005/0121967 A1 | * | 6/2005 | Crowl | 297/482 |

\* cited by examiner

*Primary Examiner* — Peter Brown

(57) ABSTRACT

Described in this invention is an inflatable cushion apparatus for a vehicle, which may be applied in multiple embodiments. One such apparatus is a cushioned strap that may be used with or in place of a standard seat belt shoulder strap. A strap may also be employed across the lap strap. A second embodiment may be used a vehicle seat cushioned. Disposed within both embodiments is an inflatable tube within channels created by seams, which may be inflated and deflated to accommodate the comfort of the user.

9 Claims, 4 Drawing Sheets

ADJUSTABLE AUTOMOBILE AIR CUSHION APPARATUS

BACKGROUND OF THE INVENTION

1. Field of the Technology

This invention relates, generally, to the field of after-market safety and comfort equipment for automobiles. More specifically, the embodiments of the invention relate to adjustable comfort covers for seat belts and car seats.

2. Background

Most to all states and municipalities have laws, ordinances, and regulations requiring drivers to wear seat belts. Seat belts in vehicles follow the same basic design—straps across the shoulder and lap meet at a buckle, or a buckle slides along a single strap to create the two, separate straps. Because the purpose of a seat belt is to hold drivers and passengers in a vehicle in case of an accident, seat belts often fit very tightly across the body. Seat belts also stretch across what can often be sensitive areas—the shoulder, chest, stomach, and lap. Shoulder problems and injuries are common, as are chest injuries. Also, many individuals may be overweight or have other stomach problems or ailments. For these reasons, a taut seat belt tight against an individual's body can be very uncomfortable to wear.

In the interest of comfort, many do not wear their seat belts at all. Other individuals may tamper with how the seat belt is worn in order to comply with the law but to make it more comfortable to wear. Individuals may use clips, ties, or many other implements in order to keep the seat belt from stretching tightly across them. Preventing a seat belt from being taut across an individual, whether by not wearing it or by using some implement to interfere, prohibits its function and usefulness. Such prohibition and impediment to a seat belt's function is dangerous and, in most states and municipalities, illegal. Not only could the driver receive a costly ticket, resulting in elevated insurance costs, etc. . . . , but avoiding the proper use of a seat belt could be deadly.

Additionally, car seats may often be uncomfortable. Due to back problems and injuries, long drives, or long commutes sitting in traffic, many find sitting in the seat of an automobile uncomfortable. Further, automobile seats come with varying amount of cushioning and comfort.

It would be advantageous to have an after-market consumer product to enhance the comfort of riding in an automobile and to encourage the use of seat belts by those that would avoid them because of discomfort. Such a product may be padded and fit over or attached to a seat belt to provide cushioning against the torso. Such a product may be sized and configured to fit over and attach to a car seat. Such a product may also have disposed within it air tubes that may be inflated or deflated in accordance with the desired comfort by the driver or passenger.

SUMMARY OF THE INVENTION

In accordance with the present invention, what is disclosed is an inflatable air cushion, including seaming, inflatable tubing disposed within said channels, an inflation valve, and a deflation valve.

A further embodiment of the invention includes seaming constructed such that it creates channels.

A further embodiment of the invention includes said channels disposed within said cushion such that said inflatable tubing may be inserted into them.

A further embodiment of the invention includes a clip for attaching said cushion to a standard automobile seat belt.

A further embodiment of the invention includes further disposed thereon is a clip for engaging said air cushion with a standard automobile seat belt buckle.

A further embodiment of the invention includes an inflation valve that prevents the escape of air while said inflatable tubing is being inflated.

A further embodiment of the invention includes deflation valve that prevents air from escaping said inflatable tubing while said cushion is in use.

A further embodiment of the invention includes further disposed thereon are attachment straps.

A further embodiment of the invention is further constructed with a fold such that it may be positioned on a car seat.

DETAILED DESCRIPTION OF EXEMPLARY EMBODIMENTS

Figure 1:
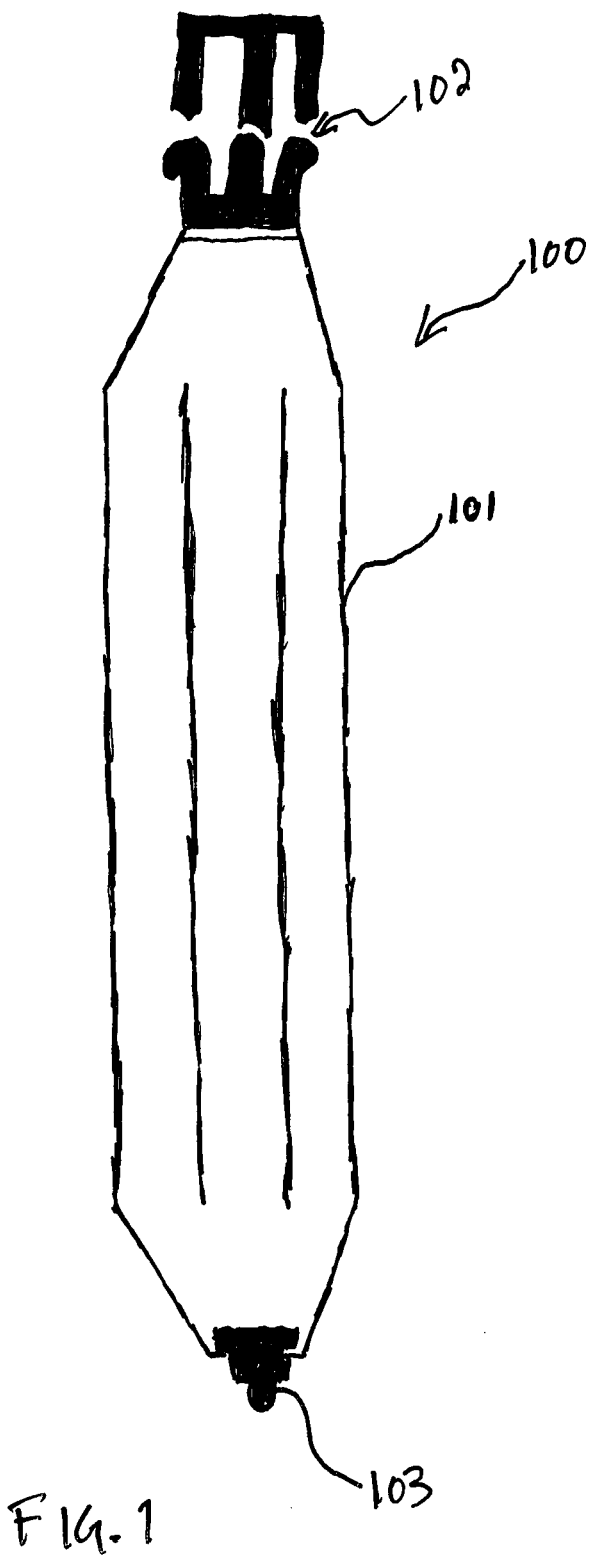
FIG. 1 is a rendering of an embodiment of the apparatus of the invention as it would be available for purchase.

Turning now to the drawings, where like numbers represent like description, herein, FIG. 1 is a rendering of an embodiment of the invention 100 as it would be available to a purchaser. The cushioned strap 101 may replace the shoulder strap portion of a standard seat belt or be configured to attach to a standard seat belt shoulder strap and fit between the standard seat belt and one's torso. In certain configurations, the cushioned strap 101 may attach to the vehicle or seat belt attachment via a clip and buckle assembly 102 or with any other connection means that will allow the cushioned strap 101 to connect to a standard seat belt and provide the same safety protections as a standard seat belt. In the embodiment shown in FIG. 1, the strap may buckle into a standard seat belt buckle via attachment means 103. It will be understood by one of ordinary skill in the art that there are a variety of ways in order to attach the cushioned strap 101 to a standard seat belt assembly. The cushioned strap 101 may be attached to an existing seat belt assembly or to the seat belt itself, so long as it functions within approved seat belt safety limits and specifications.

Figure 2:
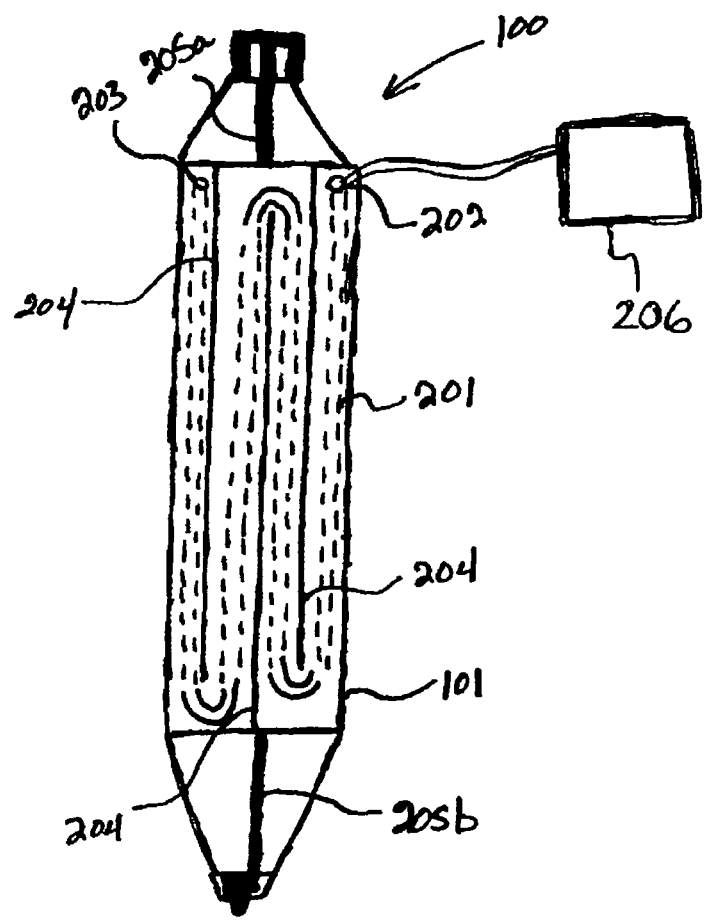
FIG. 2 shows a cut-away view of an embodiment of the apparatus of the invention.

FIG. 2 is a cut-away rendering of the embodiment 100 shown in FIG. 1. Specifically shown in FIG. 2 are inflatable tubes 201 to which the user may add air to adjust the cushioning to his or her comfort. At 202 the user may connect a standard air compressor 206 to an air valve, which will allow the tubes to fill with air without allowing it to escape. At 203, a valve is installed at the other end of the inflatable tube 201 to allow the user to let air out of the cushioned strap 101 in order to adjust the comfort and cushioning level. As shown in this embodiment, the inflatable tube 201 is placed in channels between seams 204 in order to provide cushioning coverage throughout the cushioned strap 101. It will be understood by one of ordinary skill in the art that the tubing will be of such material that it will expand at a uniform rate throughout and will be of sufficient strength to withstand being expanded and inflated. The seams 204 will be of sufficient strength to contain the expanded inflatable tube 201. It will be understood by one of ordinary skill in the art that the inflation valve 202 and the deflation valve 203 may be located at any point along the cushioned strap 101 in such a way to provide ease of use by the user. Additionally, the inflation valve 202 and the deflation valve 203 may be attached to an air compressor 206 mounted inside of a vehicle, which will allow automatic inflation and deflation of the cushioned strap 101. The inflation tube 201 and other mechanisms to inflate and deflate the cushion may be added via an opening in either end of the strap 205a, 205b. It will be understood that said opening may be of varying size and the only limitation is that said inflation tube 201 may be inserted into the strap. Additionally, the opening 205a,b, may be secured with a zipper, buttons, snaps, laces, or any other means by which an opening in fabric is generally secured.

Figure 3:
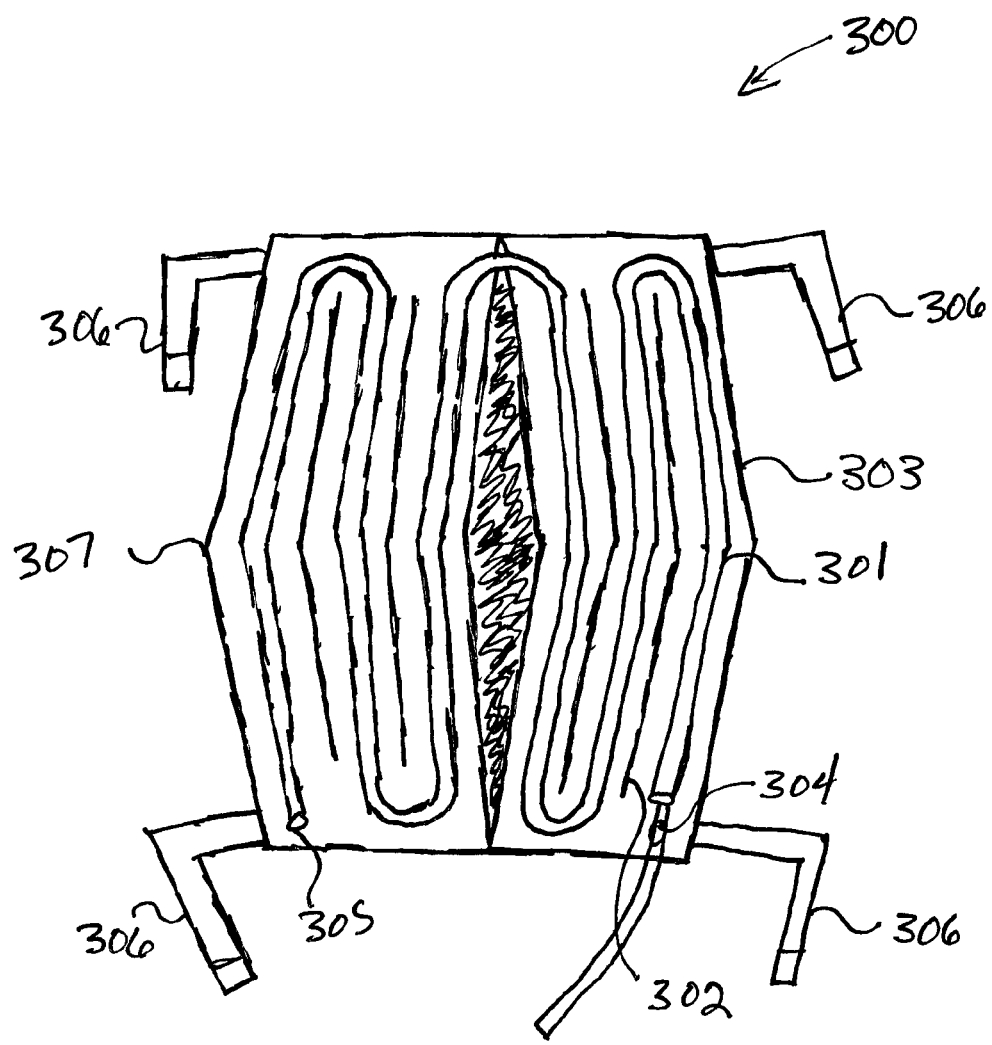
FIG. 3 shows a cut-away view of an embodiment of the invention as an automobile seat cushion.

FIG. 3 is a cut-away rendering of a second embodiment 300 of the invention, which may be implemented as a seat cushion. As is shown in FIG. 2, an inflatable tube 301 is run in channels between seams 302, which contain the inflatable tube 301 and allow for expansion of the cushion 303 throughout. An inflation valve 304 and a deflation valve 305 are included and may be inflated and deflated as stated in FIG. 2. A fold 307 differentiates the portions the halves that will lay on the seat and seat back. It will be understood by one of ordinary skill in the art that this embodiment may be installed in a variety of ways, including straps 306 that attach at the back of the seat or via the headrest, so long as the cushion 303 does not interfere with the safety and functionality of the vehicle seat. It will be further understood by one of ordinary skill in the art that the inflatable tube 301 material will be such that the driver may sit it on it while inflated for prolonged periods of time without it bursting.

Figure 5A:
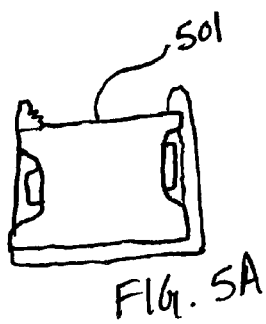
FIG. 5A is a rendering of a receiving part of a connecting, latching assembly mechanism of an embodiment of the invention.
Figure 5B:
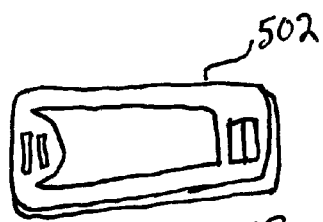
FIG. 5B is a rendering of part of the connecting, latching assembly of an embodiment of the invention.
Figure 4:
FIG. 4 is a rendering of an embodiment of the invention with an end of the latching mechanism attached.

FIG. 4 shows an embodiment of the present invention 101 with a male end 401 of a seat belt connection assembly attached to it. One of ordinary skill in the art will appreciate that the connecting end 401 is attached to the strap of the invention 101 by sewing it through arms incorporated into the connecting end 401. The connecting end 401 will mechanically engage with the receiving end of the clip 501, FIG. 5A, of the connecting assembly. In order to attach to a traditional seat belt to the strap and to the connecting assembly, the receiving end of the clip 501 is mounted on a belt clip 502 shown in FIG. 5B. One of ordinary skill in the art that the two pieces may be mounted on each other using any sort of means by which such a bonding may take place. Additionally, one will recognize that two pieces are not necessarily required and they may be manufactured as one piece.

Figure 6:
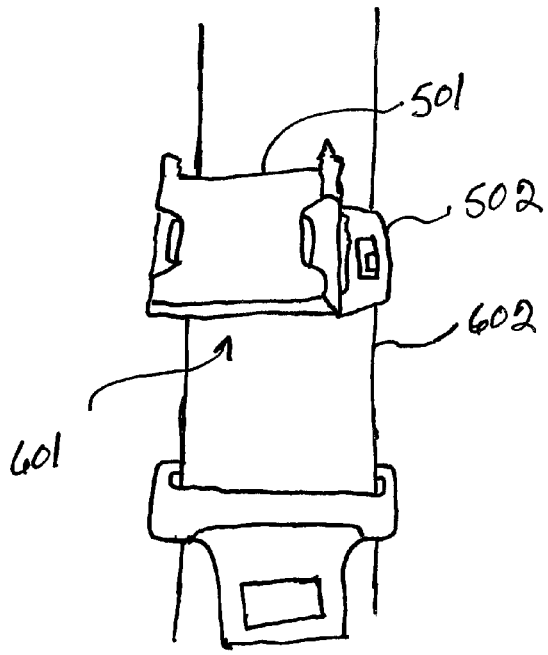
FIG. 6 is a rendering of an attachment and latching mechanism and apparatus of an embodiment of the invention attached to a traditional seat belt.

FIG. 6 shows the seat belt connection assembly 601 attached to a standard seat belt 602. The connection assembly 601 is composed of the receiving end 501 mounted onto the belt clip 502, which in turn attaches to the seat belt 602. The strap is then connected to the seat belt via the connecting end 401 being inserted into the receiving end 501 of the clip and locking.

It will be understood by one of ordinary skill in the art that the above description is of an exemplary embodiment of the invention and is not meant for purposes of limitation. An apparatus of the present invention increases the comfort of the driver while hot prohibiting or limiting safety.

What is claimed is:

1. An inflatable air cushion, comprising:
   a strap comprising seaming constructed to create channels between said seaming,
   a clip for connecting said strap to a standard automobile seat belt,
   inflatable tubing disposed within said channels, wherein said inflatable tubing comprises an inflation valve and a deflation valve, wherein said inflation valve prevents the escape of air while said inflatable tubing is being inflated and said deflation valve prevents air from escaping said inflatable tubing while said cushion is in use, and
   an air compressor in fluid communication with said inflation valve for filling said inflatable tubing with air, wherein said air compressor automatically inflates and deflates said inflatable tubing,
   wherein said channels comprise a single, continuous channel and said inflatable tubing comprises a single, continuous length of inflatable tubing disposed in said channel.

2. The air cushion of claim 1, wherein said channels are disposed within said cushion such that said inflatable tubing may be inserted into said channels.

3. The air cushion of claim 1, wherein said clip further engages said strap with a standard automobile seat belt buckle.

4. The inflatable cushion of claim 1, wherein said inflatable tubing comprises a material that expands at a uniform rate throughout the length of said inflatable tubing.

5. The inflatable cushion of claim 1, wherein said strap further comprises at least one opening for permitting insertion of said inflatable tubing into said channels.

6. The inflatable cushion of claim 5, wherein said at least one opening comprises a means for securing said at least one opening.

7. The inflatable cushion of claim 6, wherein said means for securing the opening comprises at least one of a zipper, button, snap, and lace.

8. The inflatable cushion of claim 1, wherein said channels comprise a single, continuous channel and said inflatable tubing comprises a single, continuous length of inflatable tubing disposed in said channel.

9. An inflatable air cushion, consisting of:
   seaming on a strap constructed to create channels between said seaming,
   a clip for connecting said strap to a standard automobile seat belt,
   inflatable tubing disposed within said channels, wherein said channels form a single, continuous channel and said inflatable tubing consists of a single, continuous length of inflatable tubing disposed in said channel and an inflation valve and a deflation valve, wherein said inflation valve prevents the escape of air while said inflatable tubing is being inflated and said deflation valve prevents air from escaping said inflatable tubing while said cushion is in use, and
   an air compressor in fluid communication with said inflation valve for filling said inflatable tubing with air, wherein said air compressor automatically inflates and deflates said inflatable tubing.

* * * * *